No. 11,820. Reissued Apr. 10, 1900

W. H. BRADSHAW.

FIFTH WHEEL.

(Application filed Dec. 1, 1897.)

WITNESSES:

Edward Thorpe.

Fred Acker

INVENTOR

W. H. Bradshaw

BY Munn & Co.

ATTORNEYS.

UNITED STATES PATENT OFFICE.

WILLIAM H. BRADSHAW, OF ORANGE, NEW JERSEY.

FIFTH-WHEEL

SPECIFICATION forming part of Reissued Letters Patent No. 11,820, dated April 10, 1900.

Original No. 579,357, dated March 30, 1897. Application for reissue filed December 1, 1897. Serial No. 660,450.

*To all whom it may concern:*

Be it known that I, WILLIAM H. BRADSHAW, of Orange, in the county of Essex and State of New Jersey, have invented a new and Improved Fifth-Wheel, of which the following is a full, clear, and exact description.

The object of the invention is to so construct the fifth-wheel for a vehicle that the friction will be reduced to a minimum and wherein the device will be simple, being constructed of but few parts, and also wherein roller-bearings will operate freely irrespective of the weight brought to bear upon them.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in both figures.

Figure 1:
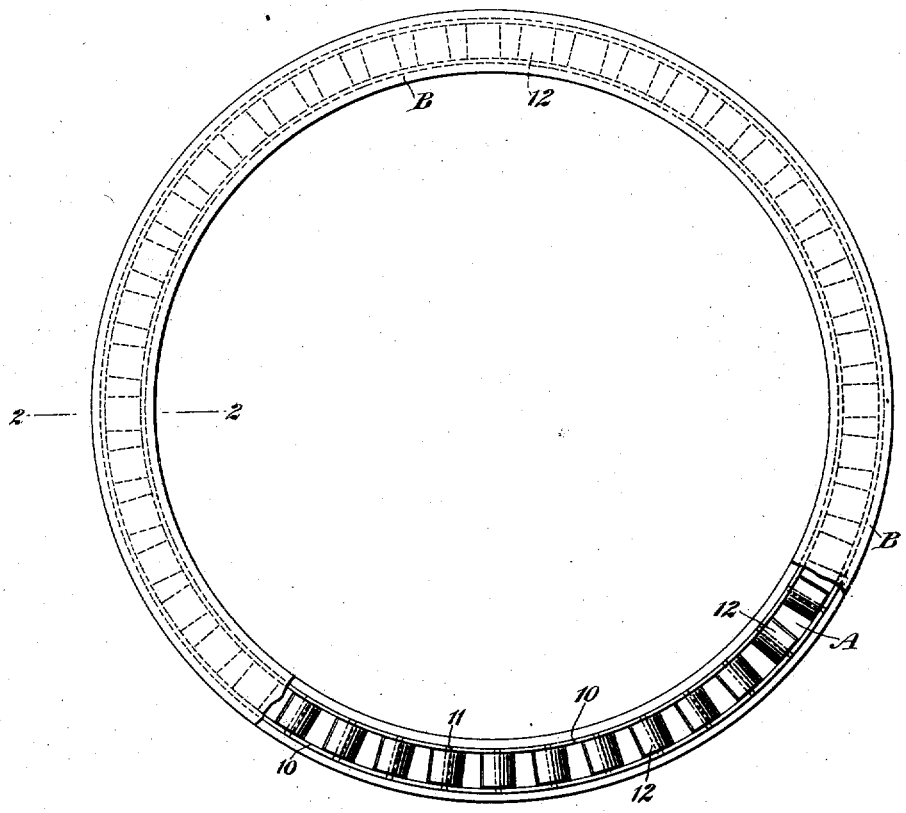
Figure 2:
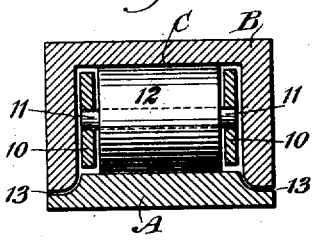

Figure 1 is a plan view of the fifth-wheel, a part of the cover being broken away; and Fig. 2 is a transverse section taken substantially on the line 2 2 of Fig. 1.

The device may be said to consist of three parts—namely, a track A, a cover B, and a traveling section C. The track A is adapted to receive the cover B, which cover is practically of inverted-U shape in cross-section, as shown in Fig. 2. The traveling section C is located within the cover and above the track, being in engagement with the latter. The aforesaid traveling section consists of two side pieces 10, of circular shape, and spindles 11, which engage the side sections, and upon each of the aforesaid spindles 11 a roller 12 is mounted to loosely revolve. The rollers engage with the track A, and preferably at each side of the track an annular recess 13 is made, which will receive the vertical members of the cover B, as illustrated in Fig. 2. It is evident that as the cover member of the device moves around the track A the rollers 12 and the frame in which the rollers are mounted will travel in a like direction, and that no matter what weight may be brought to bear upon the upper or cover-member B the traveling or rolling member C will move freely on the track.

Having thus described my invention, I claim as new and desire to secure by Letters Patent—

A fifth-wheel having an annular track-plate, the upper side edges of which are respectively provided with concentric grooves running around the track-plate at uniform distances from each other, a cover having an inverted-U-shape form, the lower edges of the sides of the cover respectively running in the grooves of the track-plate, and the outer faces of the sides of the cover being in approximate alinement with the sides of the track-plate, and an annular traveling section running circularly within the cover and upon the track-plate, the traveling section consisting in two annular and concentric bands respectively adjacent to the inner faces of the sides of the cover, and the traveling section also consisting in a series of rollers, mounted to loosely revolve upon the spindles which are respectively engaged in the bands of the traveling section, the upper face of the track-plate and the inner face of the upper portion of the cover respectively bearing on the lower and upper sides of the rollers, so as to support the cover movably on the track-plate, substantially as described.

WILLIAM H. BRADSHAW.

Witnesses:

J. FRED. ACKER,

EVERARD BOLTON MARSHALL.